(12) United States Patent
Litmanovich et al.

(10) Patent No.: US 6,219,616 B1
(45) Date of Patent: Apr. 17, 2001

(54) METHOD AND APPARATUS FOR OBTAINING ATTITUDE UPDATES IN A STRAPDOWN INERTIAL NAVIGATION SYSTEM

(75) Inventors: Yury A. Litmanovich, St. Peterburg (RU); John G. Mark, Pasadena; Daniel A. Tazartes, West Hills, both of CA (US)

(73) Assignee: Litton Systems Inc., Woodland Hills, CA (US)

( * ) Notice: Subject to any disclaimer, the term of this patent is extended or adjusted under 35 U.S.C. 154(b) by 0 days.

(21) Appl. No.: 09/294,231

(22) Filed: Apr. 22, 1999

Related U.S. Application Data
(60) Provisional application No. 60/082,768, filed on Apr. 23, 1998.

(51) Int. Cl.$^7$ .................................................. G01C 21/00
(52) U.S. Cl. ............................................................. 701/220
(58) Field of Search .................................. 701/220, 221; 702/93; 73/178 R, 180

(56) References Cited

U.S. PATENT DOCUMENTS 5,485,273 * 1/1996 Mark et al. ........................... 356/350
5,828,980 * 10/1998 Tazartes et al. ....................... 701/220

OTHER PUBLICATIONS

Jiang et al., "Improved Strapdown Coning Algorithms," IEEE Transactions on Aerospace and Electronic Suystems, vol. 28, No. 2, pp. 484–490, Apr. 1992.*

Ignagni, M., "On the Orientation Vector Differential Equation in Strapdown Inertial Systems," IEEE Transactions on Aerospace and Electronic Systems, vol. 30, No. 4, pp. 10761081, Oct. 1994.*

* cited by examiner

Primary Examiner—Ian J. Lobo
(74) Attorney, Agent, or Firm—Robert E. Malm

(57) ABSTRACT

The invention is a method and apparatus for updating the attitude of a body by utilizing a plurality of gyros to measure as a function of time the angular rate vector or the integrated angular rate vector for the body. The method comprises the steps of (1) obtaining measured values of the angular rate vector at a plurality of readout intervals, (2) obtaining a smoothed value of each of one or more smoothed representations of the angular rate vector at the end of each of a plurality of smoothing intervals, and (3) obtaining the updated attitude of the body at the end of an update interval by utilizing the attitude at the beginning of the update interval and the smoothed values of the smoothed representations of the angular rate vector obtained during the update interval. A smoothed representation is a weighted sum of the measured values obtained during a smoothing interval. The attitude is updated at the end of an update interval by applying a rotation vector to the attitude at the end of the prior update interval, the rotation vector being a weighted sum of (1) a plurality of the smoothed values and (2) the values of a plurality of cross-products of the smoothed values, the smoothed values having been obtained during the update interval.

28 Claims, 9 Drawing Sheets

| Algorithm | Estimation of rotation vector | Algorithm coefficients | Rotation vector estimation error | Coning error drift |
|---|---|---|---|---|
| 3-sample | $\Phi = \theta^{(1)} + X(\theta_1^{(1)} \times \theta_3^{(1)}) + Y\theta_2^{(1)} \times (\theta_3^{(1)} - \theta_1^{(1)})$ | $X = 0.4125$ $Y = 0.7125$ | $\dfrac{h^5}{270}(a \times d)$ | $\dfrac{a^2 h^4 \nu^5}{6,480}$ |
| 3-sample optimized | $\Phi = \theta^{(1)} + X(\theta_1^{(1)} \times \theta_3^{(1)}) + Y\theta_2^{(1)} \times (\theta_3^{(1)} - \theta_1^{(1)})$ | $X = 0.450$ $Y = 0.675$ | $\dfrac{h^5}{270}(a \times d) + \dfrac{h^5}{540}(b \times c)$ | $\dfrac{a^2 h^6 \nu^7}{204,120}$ |
| 3-multiple integral | $\Phi = \theta^{(1)} + X(\theta^{(1)} \times \theta^{(3)}) + Y_1\theta^{(2)} \times (Y_2\theta^{(3)} - \theta^{(1)})$ | $X = 6/h^2$ $Y_1 = -3/h$ $Y_2 = 4/h^2$ | $\dfrac{h^7}{700}(c \times d)$ | $\dfrac{a^2 h^6 \nu^7}{100,800}$ |

| NUMBER OF SUBINTERVALS (M) | ORDER | CROSS PRODUCT COEFFICIENTS | | | ERROR COEFFICIENT |
|---|---|---|---|---|---|
| | | DISTANCE | COEFF | DENOMINATOR | |
| 1 | 2 | NONE | | | $-\dfrac{30}{5!}$ |
| 2 | 4 | 1 | 3 | 4 | $-\dfrac{294}{7!}$ |
| 3 | 6 | 1 | 124 | 80 | $-\dfrac{4,920}{9!}$ |
| | | 2 | 33 | | |
| 4 | 8 | 1 | 17,909 | 7,560 | $-\dfrac{126,456}{11!}$ |
| | | 2 | 5,858 | | |
| | | 3 | 3,985 | | |
| 5 | 10 | 1 | 193,356 | 60,480 | $-\dfrac{4,638,816}{13!}$ |
| | | 2 | 66,994 | | |
| | | 3 | 65,404 | | |
| | | 4 | 29,761 | | |

METHOD AND APPARATUS FOR OBTAINING ATTITUDE UPDATES IN A STRAPDOWN INERTIAL NAVIGATION SYSTEM

CROSS-REFERENCE TO RELATED APPLICATIONS

This application claims the benefit of U.S. Provisional Application No. 60/082,768, filed Apr. 23, 1998.

STATEMENT REGARDING FEDERALLY SPONSORED RESEARCH AND DEVELOPMENT (Not applicable)

BACKGROUND OF THE INVENTION

This invention relates generally to strapdown inertial navigation systems and more specifically to attitude updating and coning algorithms which reduce system drift errors in the presence of coning motion.

One of the key parameters of a strapdown inertial navigation system is its response to coning motion. Substantial efforts have gone into the development of sophisticated coning algorithms which reduce system drift errors in the presence of coning motion. Present-day algorithms typically use incremental angle outputs from the gyros to form high order correction terms which reduce net coning errors (J. Mark, D. Tazartes, et. al., "Extension of Strapdown Attitude Algorithm for High-Frequency Base Motion", *Journal of Guidance, Control, and Dynamics*, Vol. 13, No. 4, July–August 1990). These algorithms assume a flat transfer function for the processing of the incremental angle outputs and are structured to yield very high order responses.

Techniques such as gyro resolution enhancement as described in U.S. Pat. No. 5,485,273, which is hereby incorporated by reference, (also described in J. Mark & D. Tazartes, "A Resolution Enhancement Technique for Laser Gyros", *Proceedings of Fourth St. Petersburg International Conference on Integrated Navigation Systems*, St. Petersburg, Russia, May 1997) can provide high resolution angle data. However, the gyro data processed for resolution enhancement has a "shaped" frequency response which must be accounted for in the design of coning algorithms.

While resolution enhanced data has been used for angular rate outputs, it has not been used in attitude generation although it would be very beneficial for applications requiring low noise, high resolution attitude information.

BRIEF SUMMARY OF THE INVENTION

The invention is a method and apparatus for updating the attitude of a body by utilizing a plurality of gyros to measure as a function of time the angular rate vector or the integrated angular rate vector for the body. The method comprises the steps of (1) obtaining measured values of the angular rate vector at a plurality of readout intervals, (2) obtaining a smoothed value of each of one or more smoothed representations of the angular rate vector at the end of each of a plurality of smoothing intervals, and (3) obtaining the updated attitude of the body at the end of an update interval by utilizing the attitude at the beginning of the update interval and the smoothed values of the smoothed representations of the angular rate vector obtained during the update interval. A smoothed representation is a weighted sum of the measured values obtained during a smoothing interval. The attitude is updated at the end of an update interval by applying a rotation vector to the attitude at the end of the prior update interval, the rotation vector being a weighted sum of (1) a plurality of the smoothed values and (2) the values of a plurality of cross-products of the smoothed values, the smoothed values having been obtained during the update interval.

DETAILED DESCRIPTION OF THE INVENTION

Figures 1, 2:
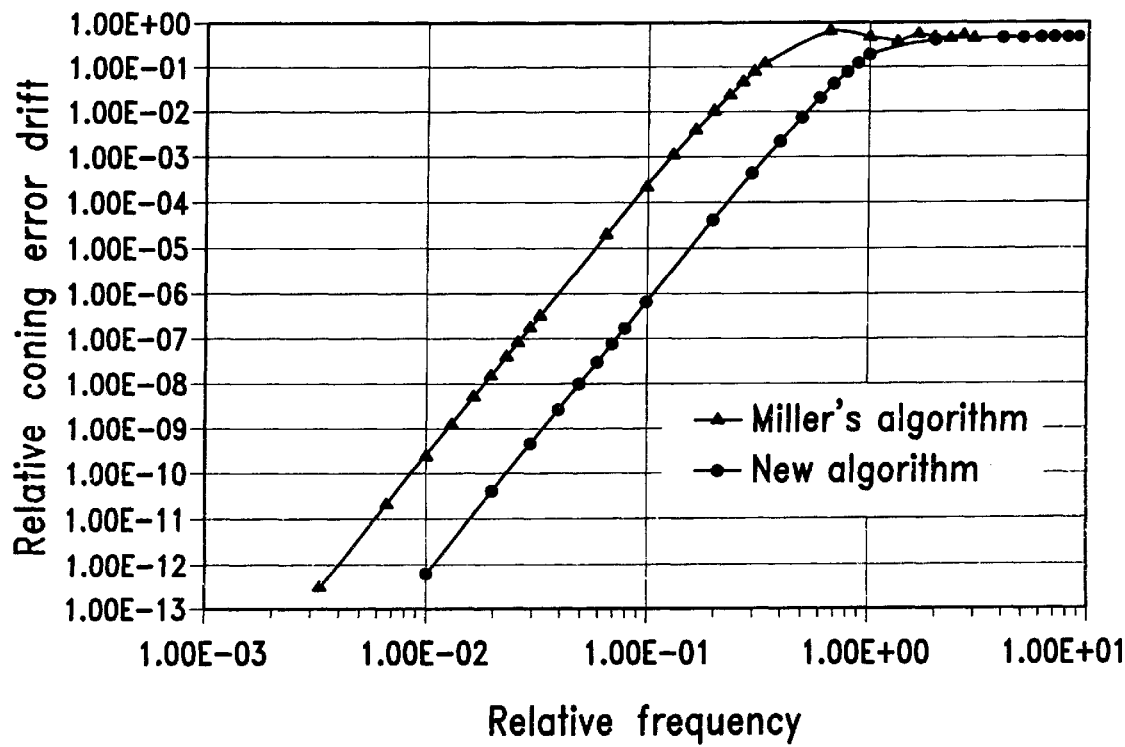
FIG. 1 provides comparison data for conventional 3-sample algorithms and the 3-multiple integral algorithm of the present invention.
FIG. 2 shows curves of relative coning error drift as a function of coning frequency for Miller's coning algorithm and the multiple integral coning algorithm of the present invention.
Figure 3:
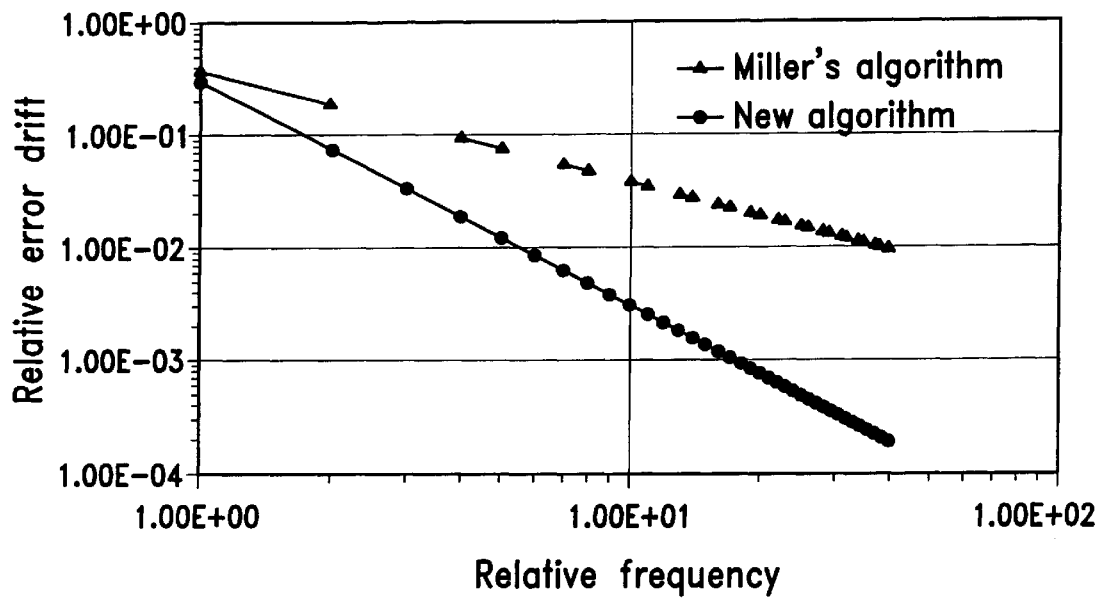
FIG. 3 shows curves of relative error drift as a function of coning frequency for Miller's coning algorithm and the multiple integral coning algorithm of the present invention assuming the presence of high-frequency noise components such that the noise frequency was divisible by the iteration frequency.
Figure 4:
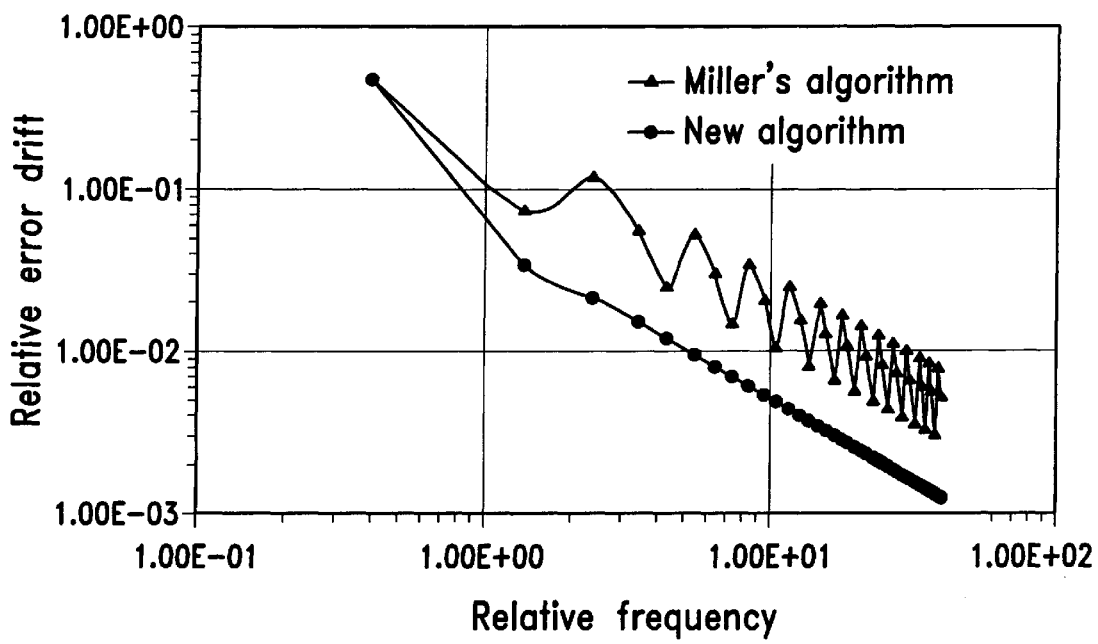
FIG. 4 shows curves of relative error drift as a function of coning frequency for Miller's coning algorithm and the multiple integral coning algorithm of the present invention assuming the presence of high-frequency noise components such that the aliased noise frequency was equal to 20 Hz.

According to the general procedure for deriving the attitude algorithm (R. B. Miller, "A New Strapdown Attitude Algorithm", *Journal of Guidance, Control and Dynamics*, Vol. 6, No. 4, 1983, pp. 287–291), a solution for the rotation vector over the iteration interval is expressed in terms of the angular rate polynomial model's coefficients, which can be determined from gyro outputs.

With this approach, the number of coefficients to be determined is equal to a number of gyro samples available over the iteration interval h. For the square-law polynomial model for the vector $\vec{\omega}(t)$ over the time interval (T, T+h)

$$\vec{\omega}(T+\tau) = \vec{a} + 2\vec{b}\tau + 6\vec{c}\frac{\tau^2}{2} \quad (1)$$

$$\vec{a} = \vec{\omega}(T) \quad (2)$$

$$2\vec{b} = \frac{d}{dt}\vec{\omega}(T)$$

where $$6\vec{c} = \frac{d^2}{dt^2}\vec{\omega}(T)$$

$$\frac{d^i}{dt^i}\vec{\omega}(T) = 0 \text{ for } i \geq 3$$

We have to have three gyro samples over the iteration interval h. The solution for the coefficients $\vec{a}$, $\vec{b}$, and $\vec{c}$ can be obtained by solving a set of three linear inhomogeneous algebraic equations. In the case of three gyro samples equally spaced over the interval h, Miller obtained the solution $$\vec{a}_e = \frac{1}{2h}\left(11\vec{\Theta}_1^{(1)} - 7\vec{\Theta}_2^{(1)} + 2\vec{\Theta}_3^{(1)}\right) \quad (3)$$

$$\vec{b}_e = \frac{9}{2h^2}\left(-2\vec{\Theta}_1^{(1)} + 3\vec{\Theta}_2^{(1)} - \vec{\Theta}_3^{(1)}\right)$$

$$\vec{c}_e = \frac{9}{2h^3}\left(\vec{\Theta}_1^{(1)} - 2\vec{\Theta}_2^{(1)} + \vec{\Theta}_3^{(1)}\right)$$

where $\vec{a}_e$, $\vec{b}_e$, and $\vec{c}_e$ are estimates of the coefficients. The quantities $\vec{\Theta}_1^{(1)}$, $\vec{\Theta}_2^{(1)}$, and $\vec{\Theta}_3^{(1)}$ are gyro outputs at times T+h/3, T+2h/3, and T+h respectively.

The algorithm for the rotation vector $\vec{\Phi}$ calculation is given by Miller as $$\vec{\Phi}(T+h) = \vec{a}h + \vec{b}h^2 + \vec{c}h^3 + \vec{d}h^4 + \frac{h^3}{6}(\vec{a}\times\vec{b}) + \frac{h^4}{4}(\vec{a}\times\vec{c}) + \frac{h^5}{10}(\vec{b}\times\vec{c}) \quad (4)$$

Substituting expressions (3) into equation (4) results in $$\vec{\Phi}(T+h) = \vec{\Theta}^{(1)} + X\left(\vec{\Theta}_1^{(1)} \times \vec{\Theta}_3^{(1)}\right) + Y\left[\vec{\Theta}_2^{(1)} \times \left(\vec{\Theta}_3^{(1)} - \vec{\Theta}_1^{(1)}\right)\right] \quad (5)$$

where $$\vec{\Theta}^{(t)} = \vec{\Theta}_1^{(1)} + \vec{\Theta}_2^{(1)} + \vec{\Theta}_3^{(1)} \quad (6)$$

X=0.4125; Y=0.7125 (6)

X=0.45; Y=0.675 (optimized for pure conic motion)

Let us now consider the problem of evaluating the angular rate model's coefficients $\vec{a}$, $\vec{b}$, and $\vec{c}$ in the presence of additive noise utilizing the least squares method (LSM). Assume that the measurements of the angular rate vector are available with an interval $\delta t$ over the interval (T, T+$\delta$T). The polynomial equation (1) can be represented in terms of measurements $Y_i$ and state vector X as follows:

$$Y_i = H_i \cdot X \quad (7)$$

where $$Y_i = \vec{\omega}_i$$

$$H_i = (1, i, i^2) \quad (8)$$

$$X = (\vec{a}, 2\vec{b}\ \delta t, 3c\delta t^2)^T$$

The LSM solution for the vector X estimates $X_e$ is given by:

$$X_e = \left[\sum_{i=1}^{N} H_i^T H_i\right]^{-1}\left[\sum_{i=1}^{N} H_i^T Y_i\right] \quad (9)$$

Substituting $H_i$ from (8), we obtain the scalar form $$\begin{pmatrix} \vec{a}_e \\ 2\vec{b}_e\delta t \\ 3\vec{c}_e\delta t^2 \end{pmatrix} = K_\omega(3\times 3)\begin{pmatrix} S_0 \\ S_1 \\ S_2 \end{pmatrix} \quad (10)$$

where $$S_0 = \sum_{i=1}^{N} \vec{\omega}_i;\ S_1 = \sum_{i=1}^{N} \vec{\omega}_i i;\ S_2 = \sum_{i=1}^{N} \vec{\omega}_i i^2 \quad (11)$$

The quantities $S_0$, $S_1$, and $S_2$ are three different smoothed representations of the angular rate vector at the end of a smoothing interval $\delta T$ where $\delta t$ is the readout interval of the measured angular rate vector $\vec{\omega}_i$. Note that a smoothed representation is a weighted sum of the measured values.

The quantity $K_{107}$ is the quadratic matrix with constant elements which are known functions of the total number of measurements N (=$\delta T/\delta t$), and i is the current index of vector measurement. It is evident that a smoothing effect is obtained if the number of measurements $Y_i$ is greater than the number of coefficients to be determined.

In the case of rate-integrating gyros, the algorithm in the above form can't be used because the current angular rate measurements are not available. In the case of rate sensors, such an approach can be applied in principle, but a great number of additional measurements should be involved to smooth over the high-frequency components. This approach leads to a proportional growth of the algorithm's complexity and makes the approach practically unusable.

The expressions for the LSM estimates can also be expressed in terms of angular rate multiple integrals $\vec{\Theta}^{(1)}$, $\vec{\Theta}^{(2)}$, and $\vec{\Theta}^{(3)}$ (the upper index denoting the multiplicity of the angular rate integral) where $$\vec{\Theta}^{(j)} = \vec{n}_N^j \cdot \delta t^j;\ j=1, 2, \quad (12)$$

and $$\vec{n}_k^1 = \sum_{i=1}^{k} \vec{\omega}_i \quad (13)$$

$$\vec{n}_k^j = \sum_{i=1}^{k} \vec{n}_i^{(j-1)}$$

The quantity $\vec{n}_i^j$ is the i'th value of a j'th smoothed representation of the angular rate vector. The value of a j'th smoothed representation for i equal to the ratio of the smoothing interval to the readout interval is called simply the smoothed value of the j'th smoothed representation of the angular rate vector.

The multiple integrals can be expressed as $$\vec{\Theta}^{(1)} = \delta t \cdot \tilde{S}_0$$

$$\vec{\Theta}^{(2)} = \delta t^2 \cdot \tilde{S}_1 \quad (14)$$

$$2\vec{\Theta}^{(3)} = \delta t^3 \cdot \tilde{S}_3 + \delta t \cdot \vec{\Theta}^{(2)}$$

where $$\tilde{S}_0 = \sum_{i=1}^{N} \vec{\omega}_i; \quad \tilde{S}_1 = \sum_{i=1}^{N} \vec{\omega}_i(N+1-i); \quad \tilde{S}_3 = \sum_{i=1}^{N} \vec{\omega}_i(N+1-i)^2 \quad (15)$$

The quantities $\tilde{S}_j$ can be expressed in terms of the quantities $S_j$. Thus, the LSM estimates defined in equation (10) can be obtained using the angular rate multiple integrals.

We will at this point, however, for reasons that will become clear, obtain solutions based on equation (1) instead:

$$\vec{a}_e = \frac{3}{h}\left(\vec{\Theta}^{(1)} - \frac{8}{h}\vec{\Theta}^{(2)} + \frac{20}{h^2}\vec{\Theta}^{(3)}\right) \quad (16)$$

$$\vec{b}_e = \frac{12}{h^2}\left(-\vec{\Theta}^{(1)} + \frac{7}{h}\vec{\Theta}^{(2)} - \frac{15}{h^2}\vec{\Theta}^{(3)}\right)$$

$$\vec{c}_e = \frac{10}{h^3}\left(\vec{\Theta}^{(1)} - \frac{6}{h}\vec{\Theta}^{(2)} + \frac{12}{h^2}\vec{\Theta}^{(3)}\right)$$

In the case of multiple integrals, the gyro sampling interval δT is equal to the iteration interval h.

The above estimates approach those obtained by the LSM method as N grows (the difference doesn't exceed 1 percent for N=100). Thus, the expressions can be used as the LSM estimates for large N.

A new algorithm for the rotation vector $\vec{\Phi}$ determination utilizing the rate multiple integrals can be obtained by substituting the expressions (16) into equation (4):

$$\vec{\Phi}(T+h) = \vec{\Theta}^{(1)} + X(\vec{\Theta}^{(1)} \times \vec{\Theta}^{(3)}) + [Y_1\vec{\Theta}^{(2)} \times (Y_2\vec{\Theta}^{(3)} - \vec{\Theta}^{(1)})] \quad (17)$$

where $$X = \frac{6}{h^2}; \quad Y_1 = -\frac{3}{h}; \quad Y_2 = \frac{4}{h^2} \quad (18)$$

It should be noted that this algorithm is identical in form to the appropriate conventional one (5), but it uses three angular rate multiple integrals over the iteration interval instead of three conventional gyro samples equally spaced over the iteration interval.

The total rotation vector calculation error $\Delta\vec{\Phi}$ is the sum of two components $\Delta\vec{\Phi}_1$ and $\Delta\vec{\Phi}_2$. The first component results from the omission of the higher-order terms in equation (4) and is given by $$\Delta\vec{\Phi}_1(T+h) = -\frac{3h^5}{10}(\vec{a} \times \vec{d}) - \frac{h^6}{6}(\vec{b} \times \vec{d}) - \frac{h^6}{3}(\vec{a} \times \vec{e}) \quad (19)$$

where 24d and 120e are the third and the fourth derivatives of the angular rate at time T.

The second component results from the errors in calculating the coefficients $\vec{a}$, $\vec{b}$, and $\vec{c}$ due to the presence of the higher-order terms in the polynomial representation of the angular rate. The impact of the third and the fourth derivatives on the estimates of the coefficients $\vec{a}$, $\vec{b}$, and $\vec{c}$ can be evaluated from the expressions $$\vec{a} = \vec{a}_e - \frac{h^3}{5}\vec{d} - \frac{3h^4}{7}\vec{e} \quad (20)$$

$$\vec{b} = \vec{b}_e - \frac{6h^2}{5}\vec{d} + \frac{16h^3}{7}\vec{e}$$

$$\vec{c} = \vec{c}_e - \frac{10h}{5}\vec{d} - \frac{20h^2}{7}\vec{e}$$

Substituting equation (20) into equation (4) yields $$\Delta\vec{\Phi}_2(T+h) = \frac{3h^5}{10}(\vec{a} \times \vec{d}) + \frac{h^6}{6}(\vec{b} \times \vec{d}) + \frac{h^6}{3}(\vec{a} \times \vec{e}) \quad (21)$$

Thus, the first and second components cancel each other out. What this means is that the error in the algorithm varies as the 7th power of h in the general case of angular motion. It should be emphasized that in the conventional Miller algorithm, which is based on the same polynomial model for the angular rate, the attainment of such an order of accuracy is possible only under pure conic motion with the algorithm's coefficients optimized for such motion. Miller's algorithm, with the coefficients optimized for conic motion, degrades in performance under a benign environment as compared to the case of using the original coefficients. The error of the Miller algorithm under the benign angular input varies as the 5th power of h.

The expression for the error of the algorithm (17) was derived taking into account the higher angular rate derivatives as follows:

$$\Delta\vec{\Phi}(T+h) = \frac{h^7}{700}(\vec{c} \times \vec{d}) \quad (22)$$

For pure coning, the error component along the coning axis (say x) is $$|\Delta\vec{\Phi}_x| = -\frac{\alpha^2 h^2 v^7}{100,800} \quad (23)$$

where α is the coning half-angle and v is the coning circular frequency. The comparative characteristics of both algorithms are summarized in FIG. 1. Note that the coning error drift for the present invention ("3-multiple integral") is approximately half that of the conventional 3-sample optimized (for pure conic motion) algorithm.

By applying the present invention with the higher-order polynomial models for the angular rate, a set of attitude algorithms of higher-order accuracy can be derived which use angular rate multiple integrals of increasing multiplicity. In the conventional algorithms, the higher accuracy is provided by involving greater number of gyro samples over the iteration interval. In this new family of algorithms, higher accuracy is provided by using the multiple integrals of higher multiplicity at a constant sampling rate equal to the iteration rate.

The unusual "autocompensation" property of the algorithm (17) whereby the first and second components cancel is also true for the algorithm where the first four multiple integrals are used to generate the estimates of the cubic angular rate polynomial model's coefficients. It is reasonable to suppose that the property is characteristic of all of the algorithms in the family.

Simulation results for both the present invention ("new algorithm") and the conventional one (Miller's) are shown in FIG. 2. The iteration rate was held at 1 kHz while the coning frequency was varied from 10 Hz to 10 kHz.

The relative smoothing properties of the new algorithm and the Miller algorithm are shown in FIGS. (3), (4), and (5). The simulation was performed with high-frequency noise components present. Two orthogonal angular rate components were specified as the harmonics of the same frequency $v_n$ and amplitude $\omega_n$ but with a 90 degree phase shift. The third component was taken to be zero. Under these circumstances, an error drift, similar to the coning drift, arises. If the iteration rate is higher than the harmonic frequency, the error drift can be obtained from the expression $$\epsilon = \omega_n^2/(2v_n) \quad (24)$$

As the iteration rate becomes lower than the noise frequency, the angular rate noise components are smoothed over by the algorithm so that the error drift diminishes as the noise frequency increases. The relative error drift (which is the ratio of the error drift to its maximum value given by expression (23) as a function of the relative frequency (which is the ratio of the noise frequency to the sampling frequency) is presented for both algorithms in FIGS. (3) and (4).

In the simulation, the noise frequency varied from 50 Hz to 2 kHz with the iteration rate fixed at 50 Hz. The noise amplitude was taken to be constant. In the FIG. (3) results, the noise frequency was taken to be devisible by the iteration frequency, and in the FIG. (4), it was taken such that the aliased noise frequency $v_n = v_n - k/h$ (k=1, 2, ...) was equal to 20 Hz.

In the next stage, the comparative simulation of both algorithms was performed under pure coning in combination with the noise components which were specified as just described. The frequency of the noise harmonics was taken in such a way that the aliased noise frequency was equal to the coning frequency. Thus, an additional error drift (apart from the coning error drift) arises which is normalized by the value $$\epsilon = \omega_n \alpha/2 \quad (25)$$

The coning parameters were taken as $v=10$ Hz and $\alpha=1$ degree. The results are shown in FIG. (5). As one can see, the new algorithm provides a noticeable improvement over the appropriate conventional algorithm in smoothing the high-frequency noise components.

It is customary to suppress the high-frequency translational vibration and/or instrument noise while generating the angular rate data for a flight control system. This problem is typically solved separately from the attitude algorithm using lowpass anti-aliasing pre-filtering. The invention species described above incorporates this filtering process into the attitude algorithm.

Another species of the invention will now be described which continues the use of filtered angular rate data as inputs to an attitude algorithm, but achieves improved results by specifically tailoring the algorithm for the use of filtered angular rate data.

A pure coning motion can be represented in terms of the vector angle $\vec{\phi}$ where $$\vec{\phi} = \epsilon \sin(\omega t) \vec{i} + \epsilon \cos(\omega t) \vec{j} \quad (26)$$

where $\epsilon$ is the cone half-angle, $\omega$ is the angular frequency, and t is time. The unit vectors $\vec{i}$ and $\vec{j}$ are orthogonal and normal to the Euler axis. The coning motion can also be represented by the quaternion $\tilde{q}$ where $$\tilde{q} = [\cos \epsilon/2, \sin \epsilon/2(\sin(\omega t) \vec{i} + \cos(\omega t) \vec{j})] \quad (27)$$

The angular rate vector $\vec{\Omega}$ can be found using the quaternion differential equation $$d\tilde{q}/dt = \frac{1}{2}\tilde{q}\vec{\Omega} \quad (28)$$

or $$\vec{\Omega} = 2\tilde{q}^* d\tilde{q}/dt \quad (29)$$

where the asterisk denotes the conjugate of the quaternion wherein the vector components are reversed in sign.

$$\vec{\Omega} = 2[\cos \epsilon/2, -\sin \epsilon/2(\sin(\omega t) \vec{i} + \cos(\omega t) \vec{j})]\omega[0, \sin\epsilon/2(\cos(\omega t) \vec{i} - \sin(\omega t) \vec{j})] \quad (30)$$

$$\vec{\Omega} = \omega[0, \sin\epsilon\cos(\omega t) \vec{i} - \sin\epsilon\sin(\omega t) \vec{j} + 2\sin^2\epsilon/2 \vec{k}] \quad (31)$$

The gyro incremental angle output is given by $$\Delta\vec{\theta} = \int_{(n-\frac{1}{2})\Delta t}^{(n+\frac{1}{2})\Delta t} \vec{\Omega} dt \quad (32)$$

$$\Delta\vec{\theta} = \omega\Delta t \left\{ \sin\epsilon \frac{\sin\frac{\omega\Delta t}{2}}{\frac{\omega\Delta t}{2}} [\cos(n\omega\Delta t)\vec{i} - \sin(n\omega\Delta t)\vec{j}] + 2\sin^2\frac{\epsilon}{2}\vec{k} \right\} \quad (33)$$

In strapdown systems, the quaternion is updated using a transition quaternion derived from the gyro incremental angle outputs. However, the exact transition quaternion can be computed for the coning motion described above using the expressions $$\tilde{q}^{n+\frac{1}{2}} = \tilde{q}^{n-\frac{1}{2}} \tilde{q}(\Delta\vec{\phi}) \text{ or } \tilde{q}(\Delta\vec{\phi}) = \tilde{q}^{*n-\frac{1}{2}} \tilde{q}^{n+\frac{1}{2}} \quad (34)$$

$$\tilde{q}(\Delta\vec{\phi}) = \left[\cos\frac{\epsilon}{2}, -\sin\frac{\epsilon}{2}\left(\sin\left[\left(n-\frac{1}{2}\right)\omega\Delta t\right]\vec{i} + \cos\left[\left(n-\frac{1}{2}\right)\omega\Delta t\right]\vec{j}\right)\right] \cdot \left[\cos\frac{\epsilon}{2}, \sin\frac{\epsilon}{2}\left(\sin\left[\left(n+\frac{1}{2}\right)\omega\Delta t\right]\vec{i} + \cos\left[\left(n+\frac{1}{2}\right)\omega\Delta t\right]\vec{j}\right)\right] \quad (35)$$

$$\tilde{q}(\Delta\vec{\phi}) = \left[\cos^2\frac{\epsilon}{2} + \sin^2\frac{\epsilon}{2}\cos(\omega\Delta t), \sin\epsilon\sin\frac{\omega\Delta t}{2}\cos(n\omega\Delta t)\vec{i} - \sin\epsilon\sin\frac{\omega\Delta t}{2}\sin(n\omega\Delta t)\vec{j} + \sin^2\frac{\epsilon}{2}\sin(\omega\Delta t)\vec{k}\right] \quad (36)$$

Now $\quad \tilde{q}(\Delta\vec{\phi}) = \left[\cos\frac{|\Delta\vec{\phi}|}{2}, \sin\frac{|\Delta\vec{\phi}|}{2}\vec{1}_{\Delta\phi}\right] \quad (37)$ Hence, $\quad \Delta\vec{\phi} = 2\frac{\sin^{-1}\frac{|\Delta\vec{\phi}|}{2}}{\sin\frac{|\Delta\vec{\phi}|}{2}}\left(\sin\frac{|\Delta\vec{\phi}|}{2}\vec{1}_{\Delta\phi}\right) \quad (38)$ Equating the magnitudes of the vector parts of (36) and (37) yields $$\sin\frac{|\Delta\vec{\phi}|}{2} = \sqrt{\sin^2\varepsilon\sin^2\frac{\omega\Delta t}{2} + \sin^4\frac{\varepsilon}{2}\sin^2(\omega\Delta t)} \quad (39)$$

Utilizing a series expansion $$\frac{\sin^{-1}x}{x} \cong 1 + \frac{1}{3!}x^2 + \ldots$$

yields the following approximation for equation (38).

$$\Delta\vec{\phi} = SF\,\omega\Delta t\left(\sin\varepsilon\frac{\sin\frac{\omega\Delta t}{2}}{\frac{\omega\Delta t}{2}}\cos(n\omega\Delta t)\vec{i} - \right. \quad (40)$$

$$\left. \sin\varepsilon\frac{\sin\frac{\omega\Delta t}{2}}{\frac{\omega\Delta t}{2}}\sin(n\omega\Delta t)\vec{j} + 2\sin^2\frac{\varepsilon}{2}\frac{\sin(\omega\Delta t)}{\omega\Delta t}\vec{k}\right)$$

where $$SF = \frac{\sin^{-1}\frac{|\Delta\vec{\phi}|}{2}}{\sin\frac{|\Delta\vec{\phi}|}{2}} \approx 1 + \frac{1}{3!}\left[\sin^2\varepsilon\sin^2\frac{\omega\Delta t}{2} + \sin^4\frac{\varepsilon}{2}\sin^2(\omega\Delta t)\right] \quad (41)$$

Note that the scale factor SF is basically dependent only on the magnitude of $(\Delta\vec{\phi})^2$ or $(\Delta\vec{\theta})^2$ and is bounded by $(|\vec{\Omega}|/2\Delta t)^2$ and not really by $\epsilon$ or $\omega$, as shown below. From equation (31), $$\frac{|\vec{\Omega}|}{2}\Delta t = \omega\Delta t\sin\frac{\varepsilon}{2} \quad (42)$$

and $$\sin^2\varepsilon\sin^2\omega\Delta\frac{t}{2} + \sin^4\frac{\varepsilon}{2}\sin^2(\omega\Delta t) = (\omega\Delta t)^2\sin^2\frac{\varepsilon}{2}\frac{\sin^2\omega\Delta\frac{t}{2}}{\left(\frac{\omega\Delta t}{2}\right)^2}(1 - \quad (43)$$

$$\sin^2\frac{\varepsilon}{2}\sin^2\omega\Delta\frac{t}{2})$$

$$= \left(\frac{|\vec{\Omega}|}{2}\Delta t\right)^2\frac{\sin^2\omega\Delta\frac{t}{2}}{\left(\frac{\omega\Delta t}{2}\right)^2}$$

$$\left(1 - \sin^2\frac{\varepsilon}{2}\sin^2\omega\Delta\frac{t}{2}\right) \le$$

$$\left(\frac{|\vec{\Omega}|}{2}\Delta t\right)^2$$

We will ignore the effect of the scale factor in the remainder of this discussion since in practice, the upper bound is small.

Thus, the target $\Delta\vec{\phi}$ desired for use in updating the quaternion is given by $$\Delta\vec{\phi} = \omega\Delta t\left(\sin\varepsilon\frac{\sin\frac{\omega\Delta t}{2}}{\frac{\omega\Delta t}{2}}\cos(n\omega\Delta t)\vec{i} - \right. \quad (44)$$

$$\left. \sin\varepsilon\frac{\sin\frac{\omega\Delta t}{2}}{\frac{\omega\Delta t}{2}}\sin(n\omega\Delta t)\vec{j} + 2\sin^2\frac{\varepsilon}{2}\frac{\sin(\omega\Delta t)}{\omega\Delta t}\vec{k}\right)$$

The normal method of deriving coning algorithms introduced by R. B. Miller ("A New Strapdown Attitude Algorithm", *Journal of Guidance, Control and Dynamics*, Vol. 6, No. 4, 1983, pp. 287–291) is to concentrate on the fact that the main difference between $\Delta\vec{\phi}$ and $\Delta\vec{\theta}$ is in the z component. Thus, we want $$\Delta\theta_z + \text{compensation} = \Delta\phi_z, \text{ or}$$

$$\text{compensation} \cong 2\sin^2\frac{\varepsilon}{2}\left(\frac{\sin(\omega\Delta t)}{\omega\Delta t} - 1\right)\omega\Delta t \quad (45)$$

The compensation is obtained by employing cross-products of $\Delta\vec{\theta}$'s from sub-intervals.

Now suppose that $$\Delta\vec{\theta} = \quad (46)$$

$$\omega\Delta t\left\{F(\omega)\sin\varepsilon\frac{\sin\frac{\omega\Delta t}{2}}{\frac{\omega\Delta t}{2}}\left[\cos(n\omega\Delta t)\vec{i} - \sin(n\omega\Delta t)\vec{j}\right] + 2F(0)\sin^2\frac{\varepsilon}{2}\vec{k}\right\}$$

where $F(\omega)$ is a digital filter function for which $$F(0) = 1$$

$$F(0) = 1 \quad (47)$$

$$\lim_{\omega\to 0}F(\omega) = 1$$

$$|F(\omega)| \le F_{\max} \text{ for all } \omega$$

$$|F(\omega)| \le F_{max} \text{ for all } \omega$$

We now consider a coning motion where the cone angle is a function of frequency, i.e. $\epsilon = \epsilon_0 g(\omega)$. Then the desired vector angle $\Delta\vec{\phi}$ is approximately given by equation (40).

$$\Delta\vec{\phi} = \omega\Delta t\left(\sin(\varepsilon_0 g(\omega))\frac{\sin\frac{\omega\Delta t}{2}}{\frac{\omega\Delta t}{2}}\cos(n\omega\Delta t)\vec{i} - \right. \quad (48)$$

$$\left. \sin(\varepsilon_0 g(\omega))\frac{\sin\frac{\omega\Delta t}{2}}{\frac{\omega\Delta t}{2}}\sin(n\omega\Delta t)\vec{j} + 2\sin^2\frac{\varepsilon_0 g(\omega)}{2}\frac{\sin(\omega\Delta t)}{\omega\Delta t}\vec{k}\right)$$

We now equate the AC parts of equations (46) and (48) and obtain the following:

$$F(\omega)\sin\,\epsilon = \sin(g(\omega)\epsilon_0) \text{ and solving for } g(\omega),$$

$$g(\omega) = 1/\epsilon_0\,\sin^{-1}(F(\omega)\sin\,\epsilon) \quad (49)$$

The function $g(\omega)$ defines the apparent cone resulting from the filtered data. The term appearing in the third (DC) component of equation (48) is scaled by the factor $$\sin^2\frac{\varepsilon_0 g(\omega)}{2} = \frac{1-\cos(\varepsilon_0 g(\omega))}{2} = \frac{1-\cos(\sin^{-1}(F(\omega)\sin\varepsilon))}{2} \quad (50)$$

For either small $\omega$ or small $\varepsilon$, the above factor can be approximated in many cases by $$\sin^2\left(\frac{\varepsilon_0 g(\omega)}{2}\right) \approx F^2(\omega)\sin^2\frac{\varepsilon}{2} \quad (51)$$

Substituting equation (49) and approximation (51) into equation (48) yields the desired $\Delta\vec{\phi}$.

$$\Delta\vec{\phi} = \omega\Delta t \left\{ F(\omega)\sin\varepsilon \frac{\sin\frac{\omega\Delta t}{2}}{\frac{\omega\Delta t}{2}} [\cos(n\omega\Delta t)\vec{i} - \sin(n\omega\Delta t)\vec{j}] + 2F^2(\omega)\sin^2\frac{\varepsilon}{2}\frac{\sin(\omega\Delta t)}{\omega\Delta t}\vec{k} \right\} \quad (52)$$

The compensation is the difference between the $\vec{k}$ components of equations (46) and (52).

$$\text{compensation} \cong \omega\Delta t\left(2F^2(\omega)\sin^2\frac{\varepsilon}{2}\frac{\sin(\omega\Delta t)}{\omega\Delta t} - 2F(0)\sin^2\frac{\varepsilon}{2}\right) \quad (53)$$

$$\cong 2\omega\Delta t\sin^2\frac{\varepsilon}{2}\left(F^2(\omega)\frac{\sin(\omega\Delta t)}{\omega\Delta t} - 1\right)$$

It should be noted that equation (53) collapses into equation (45) when $F(\omega)=1$.

The generalized Miller method breaks up each quaternion update interval into m subintervals of duration $\Delta t$. A $\Delta\vec{\theta}$ is obtained in each subinterval and vector cross-products formed between the subinterval $\Delta\vec{\theta}$'s according to their spacing in time. For example, with m=4, subinterval spacings of 1, 2, and 3 are possible. A one-subinterval spacing results in the category-1 cross-products $\Delta\vec{\theta}_1 \times \Delta\vec{\theta}_2$, $\Delta\vec{\theta}_2 \times \Delta\vec{\theta}_3$, and $\Delta\vec{\theta}_3 \times \Delta\vec{\theta}_4$. A two-subinterval spacing results in the category-2 cross-products $\Delta\vec{\theta}_1 \times \Delta\vec{\theta}_3$ and $\Delta\vec{\theta}_2 \times \Delta\vec{\theta}_4$. A three-subinterval spacing results in the category 3 cross-product $\Delta\vec{\theta}_1 \times \Delta\vec{\theta}_4$.

In general, there will be m−1 possible subinterval spacings and $C_m^2$ possible cross-products. Each category of cross-products is described by the quantity $C_p(n)$ where $$C_p(n) = (\Delta\vec{\theta}_{nm} \times \Delta\vec{\theta}_{nm+p})\vec{k}\text{-component} \quad (54)$$

It can be shown that all cross-products with the same spacing have the same $\vec{k}$ component. The AC components (i.e. $\vec{i}$ and $\vec{j}$) have only higher order terms (i.e. $\varepsilon^3$ and $F^3(\omega)$) and can be ignored.

Returning to equation (46) and appropriately substituting into the above expression yields:

$$C_p(n) = -(\omega\Delta t)^2 F^2(\omega)\sin^2\varepsilon \frac{\sin^2\frac{\omega\Delta t}{2}}{\left(\frac{\omega\Delta t}{2}\right)^2}\sin(p\omega\Delta t) \quad (55)$$

Note that the expression above does not depend on n.

In the case of resolution-enhanced data (U.S. Pat. No. 5,485,273), $$F(\omega) \cong \frac{\sin\frac{\omega\Delta t}{2}}{\frac{\omega\Delta t}{2}} \quad (56)$$

It follows that $$C_p(n) \cong -(\omega\Delta t)^2\sin^2\varepsilon \frac{\sin^4\frac{\omega\Delta t}{2}}{\left(\frac{\omega\Delta t}{2}\right)^4}\sin(p\omega\Delta t) \quad (57)$$

Let $\alpha=\omega\Delta t$; then $$C_p(n) \cong -\alpha^2\sin^2\varepsilon \frac{\sin^4\frac{\alpha}{2}}{\left(\frac{\alpha}{2}\right)^4}\sin(p\alpha) \quad (58)$$

Now $$\frac{\sin^4\frac{\alpha}{2}}{\left(\frac{\alpha}{2}\right)^4} = \alpha^{-4}(6 - 8\cos\alpha + 2\cos(2\alpha)) \quad (59)$$

and $$C_p(n) \cong -\frac{\sin^2\varepsilon}{\alpha^2}(6 - 8\cos\alpha + 2\cos(2\alpha))\sin(p\alpha) \quad (60)$$

$$\cong -\frac{\sin^2\varepsilon}{\alpha^2}\{\sin[(p-2)\alpha] - 4\sin[(p-1)\alpha] + 6\sin(p\alpha) - 4\sin[(p+1)\alpha] + \sin[(p+2)\alpha]\}$$

$$\cong -\frac{\sin^2\varepsilon}{\alpha^2}\left[\sum_{k=1}^{\infty}(-1)^k((p-2)^{2k-1} - 4(p-1)^{2k-1} + 6p^{2k-1} - 4(p+1)^{2k-1} + (p+2)^{2k-1})\frac{\alpha^{2k-1}}{(2k-1)!}\right]$$

Evaluating the k=1 and k=2 terms of the sum reveals that these are zero for any value of p. Thus, the sum reduces to $$C_p(n) \cong \frac{\sin^2\varepsilon}{\alpha^2}\left[\sum_{k=1}^{\infty}(-1)^k((p-2)^{2k+3} - 4(p-1)^{2k+3} + 6p^{2k+3} - 4(p+1)^{2k+3} + (p+2)^{2k+3})\frac{\alpha^{2k+3}}{(2k+3)!}\right] \quad (61)$$

Returning to equation (53) which gives the desired compensation, we obtain $$\text{desired compensation} \cong 2\omega m\Delta t \sin^2\frac{\varepsilon}{2}\left(F^2(\omega)\frac{\sin(\omega m\Delta t)}{\omega m\Delta t} - 1\right) \quad (62)$$

For resolution-enhanced data, we substitute equation (56) to yield $$\text{desired compensaation} \cong -2\omega m\Delta t \sin^2\frac{\varepsilon}{2}\left(1 - \frac{\sin^2\omega\Delta\frac{t}{2}}{\left(\frac{\omega\Delta t}{2}\right)^2}\frac{\sin(\omega m\Delta t)}{\omega m\Delta t}\right) \quad (63)$$

The parenthetical expression in the above equation is expanded by means of trigonometric identities.

$$( ) = 1 - \frac{4}{m\alpha^3}\left(\frac{1-\cos\alpha}{2}\right)\sin(m\alpha) \quad (64)$$

$$= 1 - \frac{1}{m\alpha^3}\{-\sin[(m-1)\alpha] + 2\sin(m\alpha) - \sin[(m+1)\alpha]\}$$

$$= 1 - \frac{1}{m\alpha^3}\sum_{k=1}^{\infty}(-1)^k[(m-1)^{2k-1} - 2m^{2k-1} + (m+1)^{2k-1}]\frac{\alpha^{2k-1}}{(2k-1)!}$$

For k=1, the expression within the sum vanishes. For k=2, the expression corresponding to the sum is 1. Thus, the parenthetical expression can be rewritten as $$( ) = \frac{1}{m}\sum_{k=1}^{\infty}(-1)^{k+1}[(m-1)^{2k+3} - 2m^{2k+3} + (m+1)^{2k+3}]\frac{\alpha^{2k}}{(2k+3)!} \quad (65)$$

Finally, substituting (65) into (63) yields:

$$\text{desired compensation} = \quad (66)$$

$$2\omega\Delta t \sin^2\frac{\varepsilon}{2}\sum_{k=1}^{\infty}(-1)^k[(m-1)^{2k+3} - 2m^{2k+3} + (m+1)^{2k+3}]\frac{\alpha^{2k}}{(2k+3)!}$$

Note that for m=1, no compensation is possible, and the net error will be the negative of the desired compensation. The lowest order term, expressed as a rate, will be:

$$\text{error rate} = -\frac{1}{2}\omega\sin^2\frac{\varepsilon}{2}(\omega\Delta t)^2 \quad (67)$$

For m>1, cross-products may be found and applied as compensation. Linear combinations of the (m−1) categories of cross-products are found which equal up to the (m−1)'th term of the desired compensation equation. Thus, coefficients $x_p$ are chosen such that $$\sum_{p=1}^{m-1} C_p x_p = 2\omega\Delta t \sin^2\frac{\varepsilon}{2}\sum_{k=1}^{M-1}(-1)^k[(m-1)^{2k+3} - 2m^{2k+3} + (m+1)^{2k+3}]\frac{\alpha^{2k}}{(2k+3)!} \quad (68)$$

This is equivalent to the following system of equations (using equations (61) and (68).

$$\sin^2\varepsilon\sum_{p=1}^{m-1}\{[(p-2)^{2k+3} - 4(p-1)^{2k+3} + 6p^{2k+3} - 4(p+1)^{2k+3} + \quad (69)$$

$$(p+2)^{2k+3}]x_p\} = 2\sin^2\frac{\varepsilon}{2}[(m-1)^{2k+3} - 2m^{2k+3} + (m+1)^{2k+3}]$$

Under the assumption of a small $\epsilon$, equations (69) further reduce to $$2\sum_{p=1}^{m-1}\{[(p-2)^{2k+3} - 4(p-1)^{2k+3} + 6p^{2k+3} - 4(p+1)^{2k+3} + \quad (70)$$

$$(p+2)^{2k+3}]x_p\} = [(m-1)^{2k+3} - 2m^{2k+3} + (m+1)^{2k+3}]$$

For k=1, . . . ,m−1, this leads to m−1 equations with m−1 unknowns($x_1$, . . . ,$x_{m-1}$).

Once the compensation has been applied, a residual error exists which is the remaining portion of the desired compensation. The largest order term is the m'th term of the difference between the compensation series and the desired series. This can be converted to a rate by dividing by mΔt. The relative error rate (i.e. error rate normalized to coning rate) will be of order 2m in ωΔt.

Figures 5, 6:
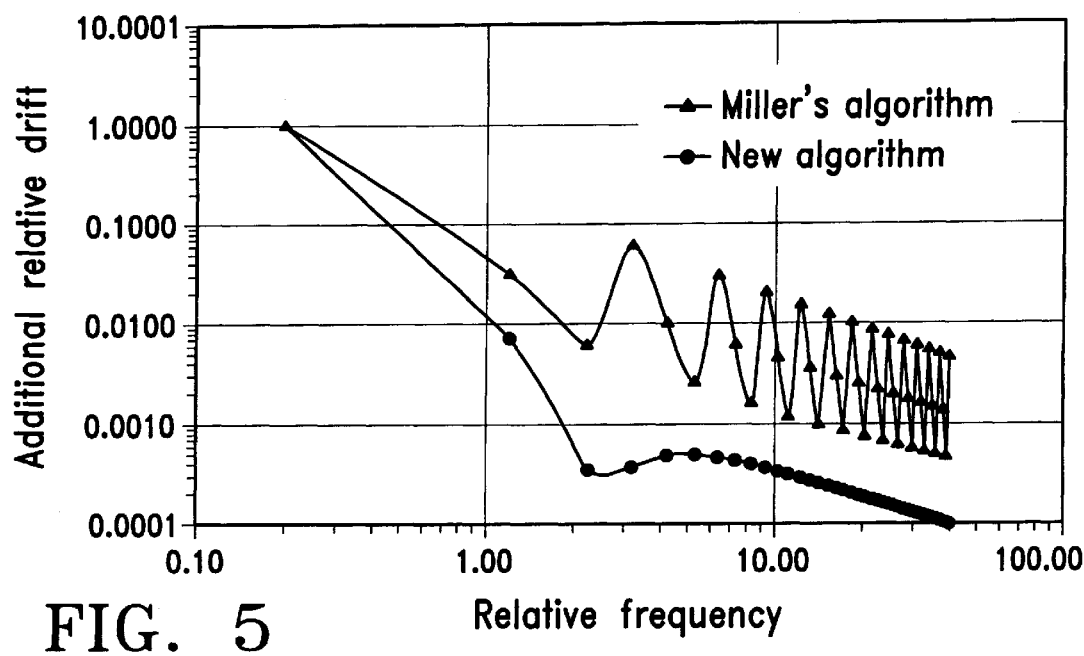
FIG. 5 shows curves of additional relative error drift as a function of coning frequency for Miller's coning algorithm and the multiple integral coning algorithm of the present invention assuming pure coning in combination with the presence of high-frequency noise components.
FIG. 6 shows computed coning compensation coefficients for the second species of the present invention.
Figure 7:
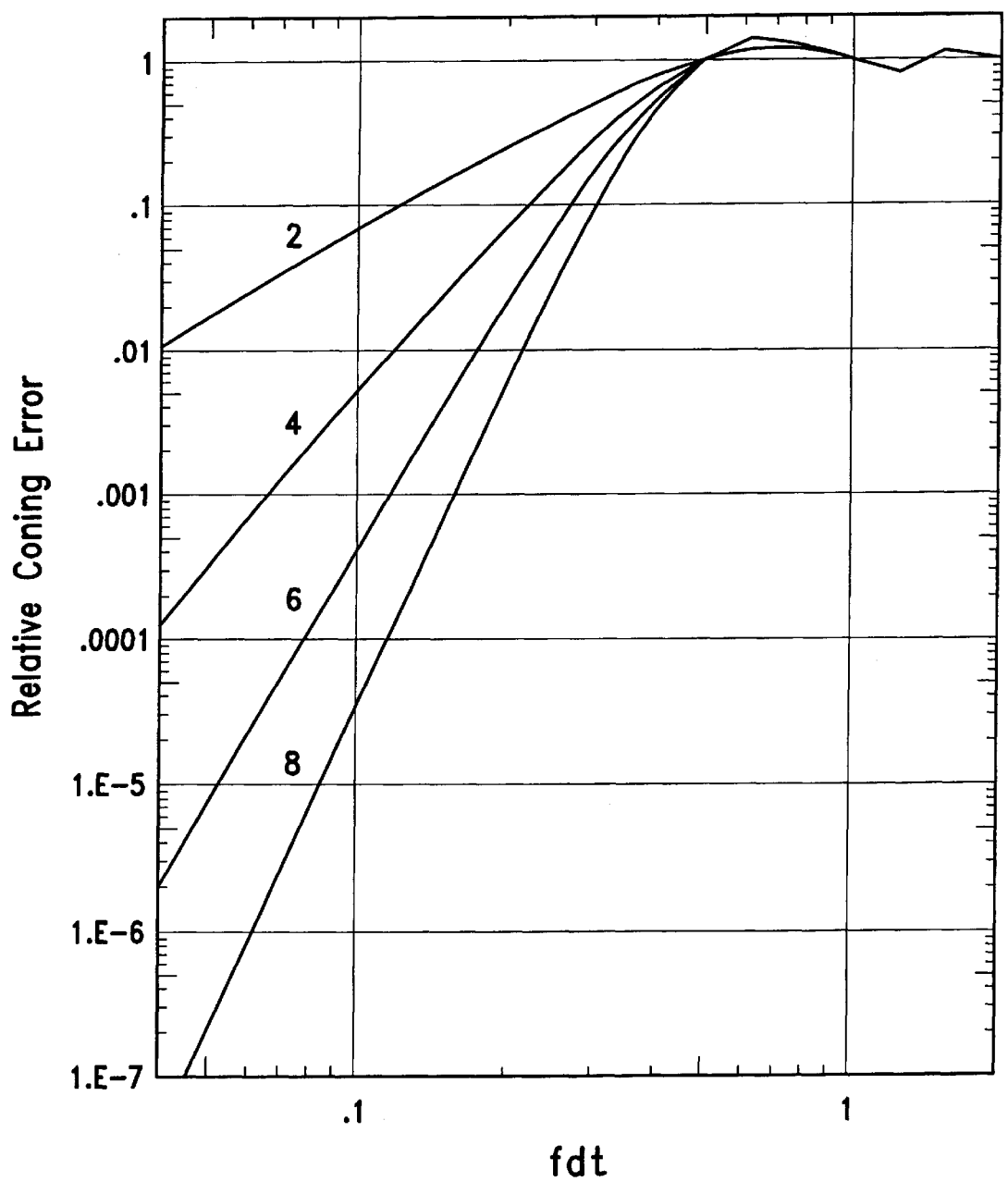
FIG. 7 shows curves of relative coning error as a function of coning frequency for representative present-day coning algorithms.
Figure 8:
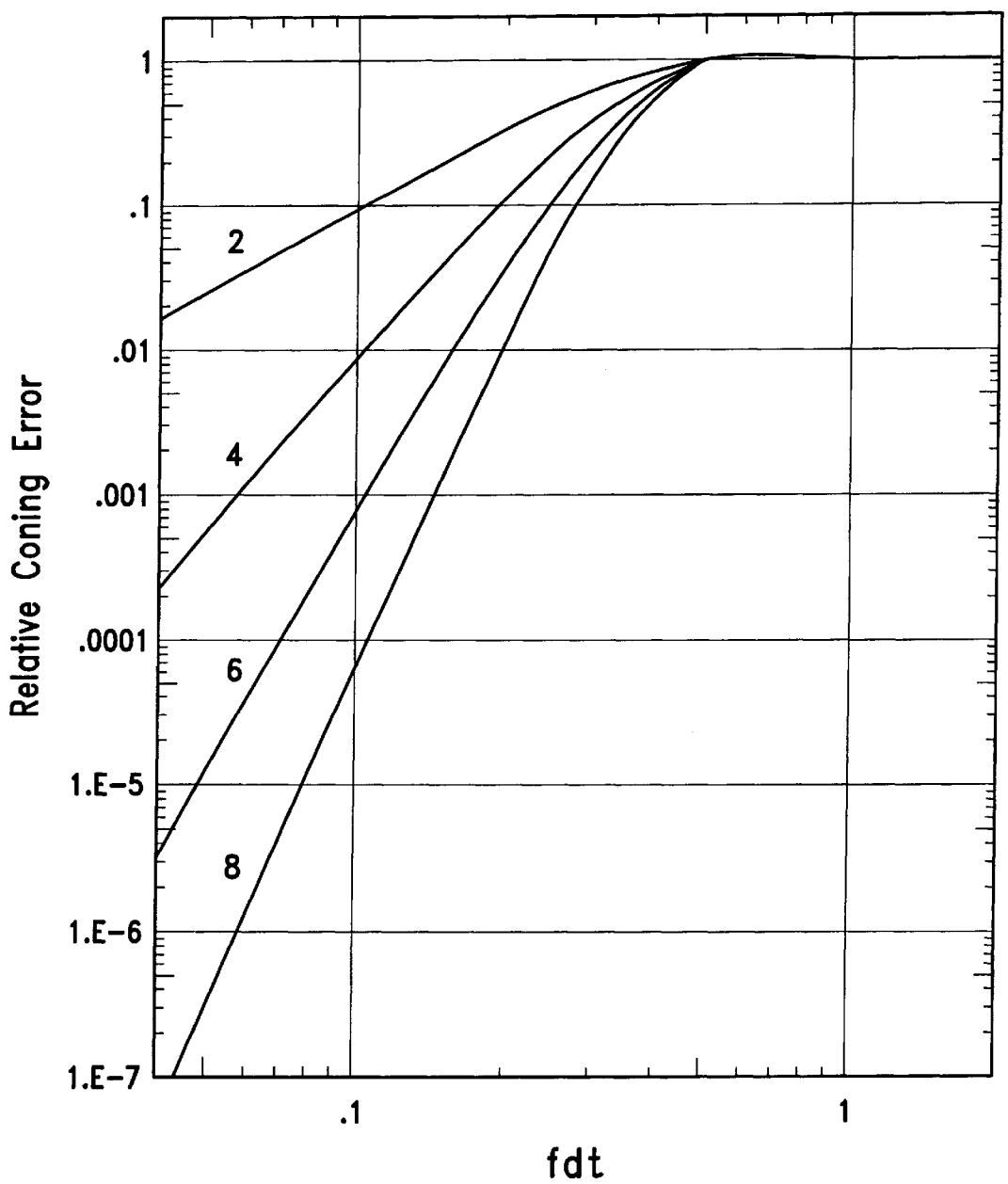
FIG. 8 shows curves of relative coning error as a function of coning frequency for the second species of the present invention.
Figure 9:
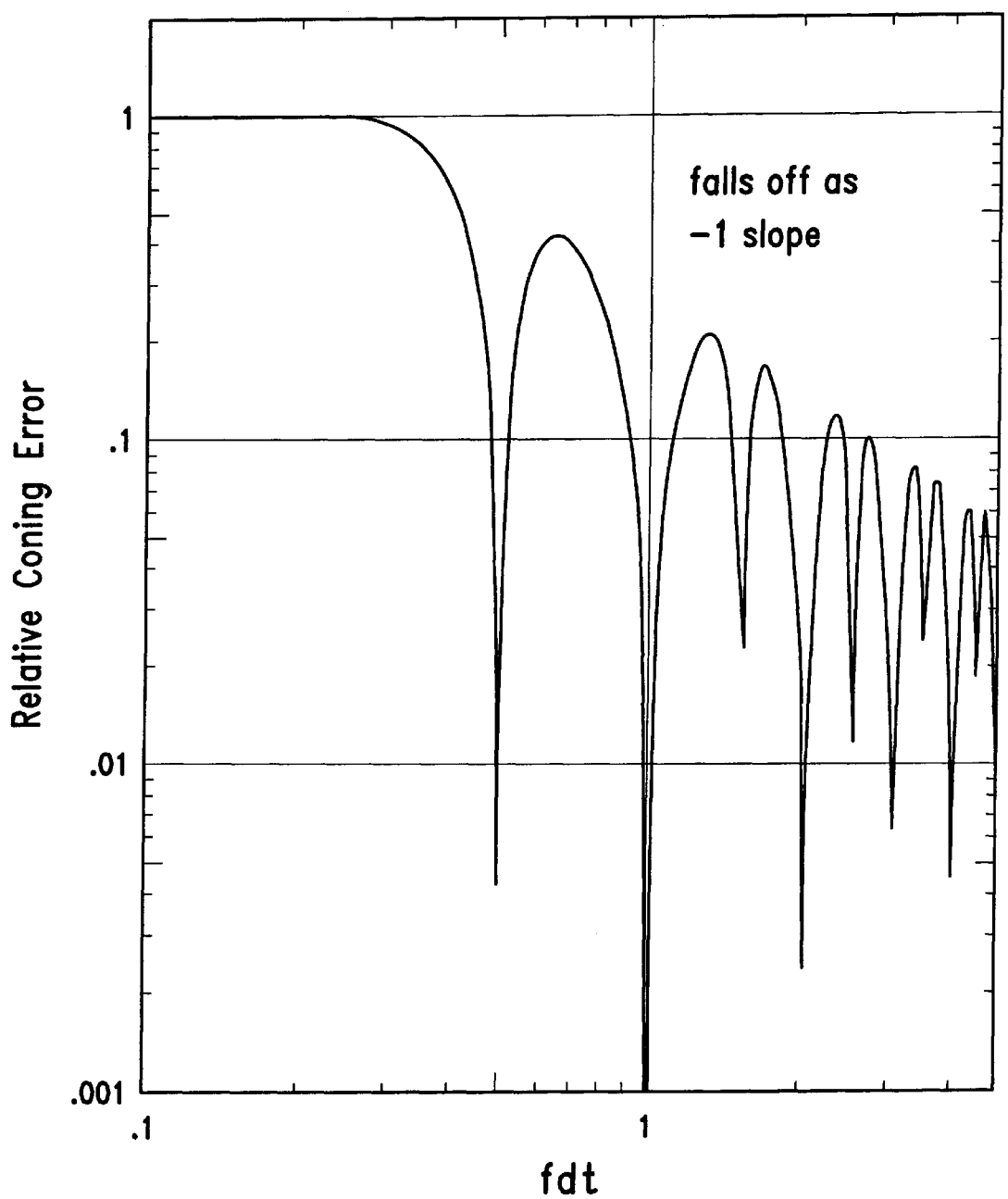
FIG. 9 shows a curve of relative coning error as a function of coning frequency for a representative 8th order present-day coning algorithm.
Figure 10:
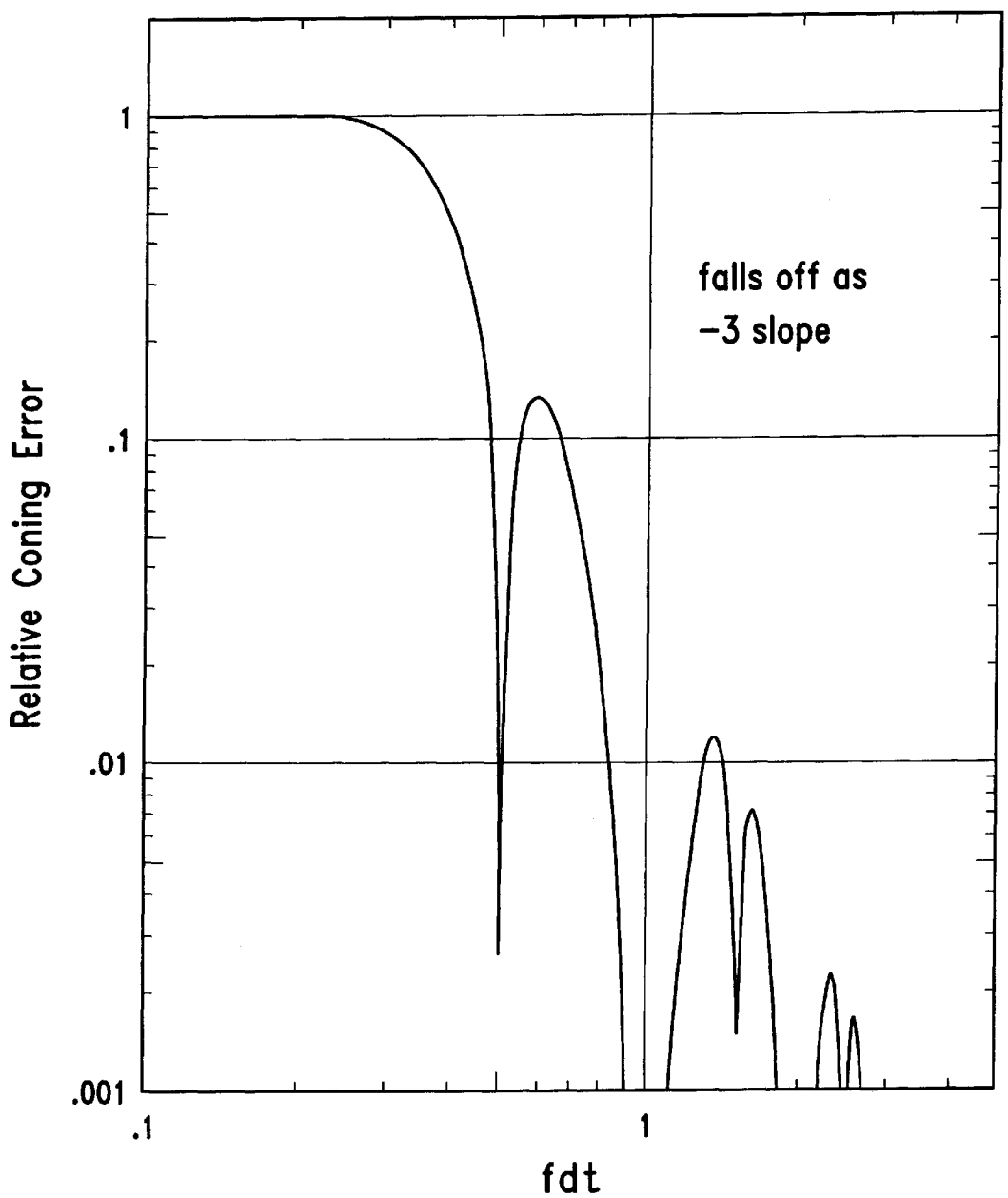
FIG. 10 shows a curve of relative coning error as a function of coning frequency for the 8th order coding algorithm of the second species of the present invention.
Figure 11:
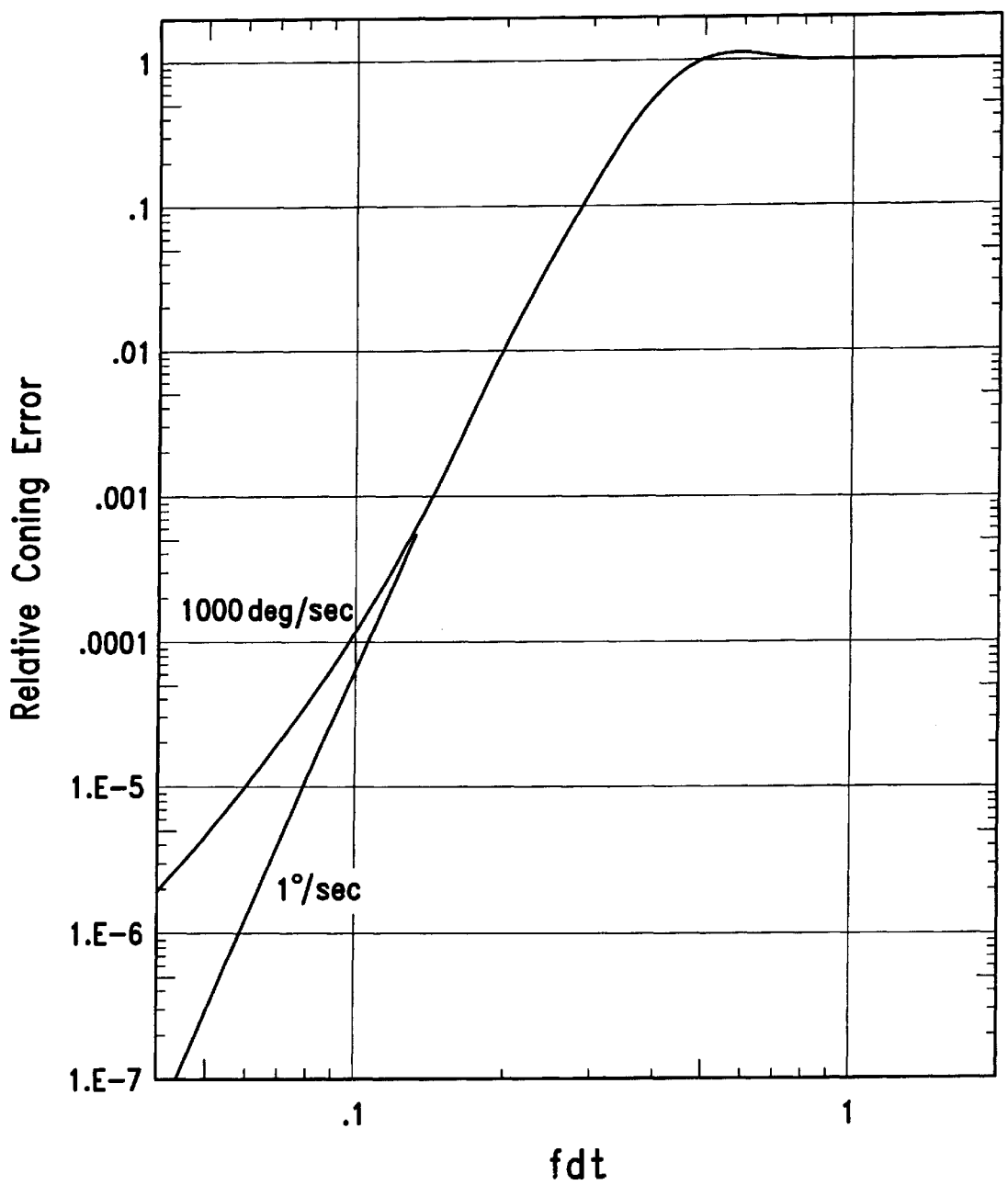
FIG. 11 shows curves of relative coning error as a function of coning frequency for the second species of the present invention and large angular rates.

The calculated coning coefficients $x_p$ are given in FIG. 6 for several values of m. Computer simulations of present-day coning algorithms yielded the response graphs shown in FIGS. 7 and 9. Computer simulations of the coning algorithms described above yielded the response graphs shown in FIGS. 8 and 10. The results for large angular rates are shown in FIG. 11.

Returning to equation (63), the desired compensation for small angles can be expressed as:

$$\text{desired compensation} \cong \frac{1}{2}m\alpha\varepsilon^2\left(F^2(\alpha)\frac{\sin(m\alpha)}{m\alpha} - 1\right) \quad (71)$$

where α has been substituted for ωΔt. The applied compensation according to equation (55) is:

$$\text{applied compensation} \cong \sum_{p=1}^{m-1} C_p x_p \quad (72)$$

$$= -\alpha^2\varepsilon^2 F^2(\alpha)\frac{\sin^2\frac{\alpha}{2}}{\left(\frac{\alpha}{2}\right)^2}\sum_{p=1}^{m-1}\sin(p\alpha)x_p$$

In comparing equations (71) and (72), it is apparent that $\alpha\epsilon^2$ appears in both. Hence, we define the following:

$$z(\alpha) = \frac{1}{2}m\left[F^2(\alpha)\frac{\sin(m\alpha)}{m\alpha} - 1\right] \quad (73)$$

The quantity z(α) is clearly an even function of α and may be expanded into a Taylor series about α=0.

$$z(\alpha) = \frac{1}{2}m\sum_{k=0}^{\infty}\frac{\alpha^{2k}}{(2k)!}\frac{d^{2k}}{d\alpha^{2k}}\left[F^2(\alpha)\frac{\sin(m\alpha)}{m\alpha} - 1\right]\bigg|_{\alpha=0} \quad (74)$$

Since $$\lim_{\alpha \to 0} F(\alpha) = 1,$$

the k=0 term of the equation is zero. Consequently, $$z(\alpha) = \frac{1}{2}m \sum_{k=1}^{\infty} \frac{\alpha^{2k}}{(2k)!} \frac{d^{2k}}{d\alpha^{2k}} \left[ F^2(\alpha) \frac{\sin(m\alpha)}{m\alpha} \right] \bigg|_{\alpha=0} \quad (75)$$

We also define:

$$y(\alpha) = \frac{1}{\alpha \varepsilon^2} \sum_{p=1}^{m-1} C_p x_p = -\alpha F^2(\alpha) \frac{\sin^2 \frac{\alpha}{2}}{\left(\frac{\alpha}{2}\right)^2} \sum_{p=1}^{m-1} \sin(p\alpha) x_p \quad (76)$$

This is also an even function of α and may be expanded into a Taylor series:

$$y(\alpha) = -\sum_{p=1}^{m-1} \left\{ \sum_{k=0}^{\infty} \frac{\alpha^{2k}}{(2k)!} \frac{d^{2k}}{d\alpha^{2k}} \left[ \alpha F^2(\alpha) \frac{\sin^2 \frac{\alpha}{2}}{\left(\frac{\alpha}{2}\right)^2} \sin(p\alpha) \right] \bigg|_{\alpha=0} \right\} x_p \quad (77)$$

The k=0 term of the internal summation is zero and consequently, $$y(\alpha) = -\sum_{p=1}^{m-1} \left\{ \sum_{k=1}^{\infty} \frac{\alpha^{2k}}{(2k)!} \frac{d^{2k}}{d\alpha^{2k}} \left[ \alpha F^2(\alpha) \frac{\sin^2 \frac{\alpha}{2}}{\left(\frac{\alpha}{2}\right)^2} \sin(p\alpha) \right] \bigg|_{\alpha=0} \right\} x_p \quad (78)$$

We now equate the first (m−1) terms of the k series of equations (75) and (78) to yield m−1 equations with m−1 unknowns $x_1, x_2, \ldots, x_{m-1}$. For k=1 to m−1, $$\sum_{p=1}^{m-1} \frac{d^{2k}}{d\alpha^{2k}} \left[ \alpha F^2(\alpha) \frac{\sin^2 \frac{\alpha}{2}}{\left(\frac{\alpha}{2}\right)^2} \sin(p\alpha) \right] \bigg|_{\alpha=0} x_p = -\frac{1}{2}m \frac{d^{2k}}{d\alpha^{2k}} \left[ F^2(\alpha) \frac{\sin(m\alpha)}{m\alpha} \right] \bigg|_{\alpha=0} \quad (79)$$

The solution to these equations leads to the cancellation of all terms of order 2m−2 and above, leaving terms of order 2m in the relative error rate. This type of analysis may be used for a variety of filter functions F(ω) including a lowpass filter.

Figure 12:
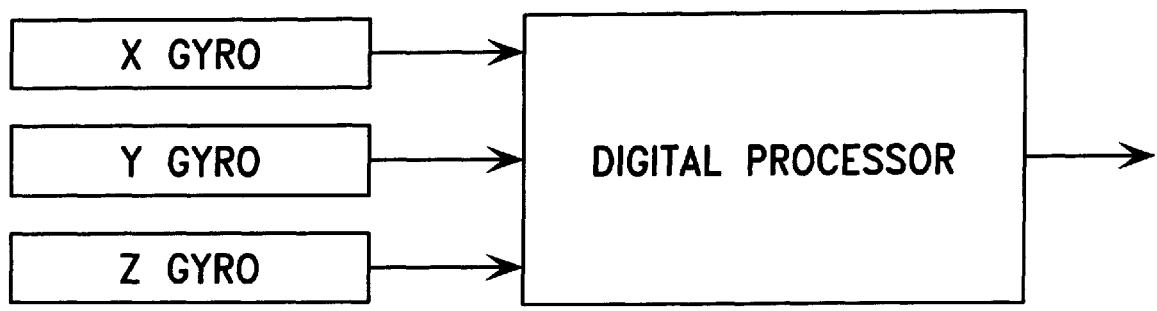
FIG. 12 is a block diagram of the gyros and digitial processor of an inertial navigation system wherein attitude updating is accomplished and coning algorithms are utilized.

A block diagram of the digital processor used in determining attitude together with the x gyro, y gyro, and z gyro which provide the inputs for the determination is shown in FIG. 12. The digital processor is part of a strapdown inertial navigation system. The output of the digital processor provides the attitude of the body to which the inertial navigation system is attached in a local-level coordinate system.

What is claimed is:

1. A method for updating the attitude of a body by utilizing a plurality of gyros to measure as a function of time the angular rate vector or the integrated angular rate vector for the body, the method comprising the steps:

obtaining measured values of the angular rate vector at a plurality of readout intervals;

obtaining a smoothed value of each of one or more smoothed representations of the angular rate vector at the end of each of a plurality of smoothing intervals, a smoothed representation being a weighted sum of the measured values obtained during a smoothing interval, at least one of the weights for at least one of the smoothed representations being different from the other weights for the same smoothed representation, the ratio of the smoothing interval to the readout interval being an integer N;

obtaining the updated attitude of the body at the end of an update interval by utilizing the attitude at the beginning of the update interval and the smoothed values of the smoothed representations of the angular rate vector obtained during the update interval, the ratio of the update interval to the smoothing interval being an integer M.

2. The method of claim 1 wherein the angular rate vector is represented within an update interval by a power series in time measured from the beginning of the update interval, the q'th vector coefficient being the vector coefficient of the q'th power of time, the q'th vector coefficient being proportional to the q'th derivative of the angular rate vector evaluated at the beginning of the update interval, q taking on integer values beginning with zero, the estimated q'th vector coefficient being a weighted sum of the smoothed values obtained during the update interval.

3. The method of claim 1 wherein the attitude is updated at the end of an update interval by applying a rotation vector to the attitude at the end of the prior update interval, the rotation vector being a weighted sum of (1) a plurality of the smoothed values and (2) the values of a plurality of cross-products of the smoothed values, the smoothed values having been obtained during the update interval.

4. The method of claim 1 wherein smoothed values of a plurality of smoothed representations of the angular rate vector are obtained for each smoothing interval, the smoothing interval being equal to the update interval.

5. The method of claim 4 wherein the step of obtaining a smoothed value comprises the steps:

summing the first n measured values of the angular rate vector in a smoothing interval to obtain the n'th value of a first smoothed representation of the angular rate vector, n taking on integer values from 1 to N, the N'th value of the first smoothed representation being the smoothed value of the first smoothed representation;

summing the first n values of the (k−1)'th smoothed representation of the angular rate vector to obtain the n'th value of an k'th smoothed representation of the angular rate vector, k being an integer greater than 1, the N'th value of the k'th smoothed representation being the smoothed value of the k'th smoothed representation.

6. The method of claim 5 wherein the number of smoothed representations is 3 and the attitude is updated at the end of an update interval by applying a rotation vector to the attitude at the end of the prior update interval, the rotation vector being a weighted sum of the smoothed values, a first cross-product, a second cross-product, and a third cross-product, the first cross-product being the cross product of the smoothed values of the first and second smoothed representations, the second cross-product being the cross product of the smoothed values of the first and third smoothed representations, the third cross-product being the cross product of the smoothed values of the second and third smoothed representations, the weight of each smoothed value, the first cross-product, the second cross-product, and the third cross-product being proportional respectively to 1/(update interval), $-3/N$, $6/N^2$, and $-12/N^3$.

7. The method of claim 4 wherein the angular rate vector is represented within an update interval by a power series in time measured from the beginning of the update interval, the q'th vector coefficient being the vector coefficient of the q'th power of time, the q'th vector coefficient being proportional to the q'th derivative of the angular rate vector evaluated at the beginning of the update interval, q taking on integer values beginning with zero, the estimated q'th vector coefficient being a weighted sum of the smoothed values of a plurality of smoothed representations of the angular rate vector obtained during the smoothing interval.

8. The method of claim 4 wherein the attitude is updated at the end of an update interval by applying a rotation vector to the attitude at the end of the prior update interval, the rotation vector being a weighted sum of (1) a plurality of the smoothed values and (2) the values of a plurality of cross-products of the smoothed values, the smoothed values having been obtained during the update interval.

9. The method of claim 1 wherein a single smoothed value from a single smoothed representation of the angular rate vector is obtained during each smoothing interval.

10. The method of claim 9 wherein the angular rate vector is represented within an update interval by a power series in time measured from the beginning of the update interval, the q'th vector coefficient being the vector coefficient of the q'th power of time, the q'th vector coefficient being proportional to the q'th derivative of the angular rate vector evaluated at the beginning of the update interval, q taking on integer values beginning with zero, the estimated q'th vector coefficient being a weighted sum of the smoothed values obtained during the update interval.

11. The method of claim 9 wherein the attitude is updated at the end of an update interval by applying a rotation vector to the attitude at the end of the prior update interval, the rotation vector being a weighted sum of (1) a plurality of the smoothed values and (2) the values of a plurality of cross-products of the smoothed values, the smoothed values having been obtained during the update interval.

12. The method of claim 11 wherein the number of smoothed representations is 1 and the attitude is updated at the end of an update interval by applying a rotation vector to the attitude at the end of the prior update interval, the rotation vector being a weighted sum of the smoothed values S (m) and the cross-products of the smoothed values S (m)×S (m+p), the index m denoting the associated smoothing interval and taking on values from 1 to N−1, the index p taking on values from 1 to N−m, the weights applied to each smoothed value and to each cross-product being proportional respectively to 1 and X(p), the weight X(p) being independent of m.

13. The method of claim 12 wherein N equals 2 and X(1) equals 3/4.

14. The method of claim 12 wherein N equals 3, X(1) equals 124/80, and X(2) equals 33/80.

15. The method of claim 12 wherein N equals 4, X(1) equals 17909/7560, X(2) equals 5858/7560, and X(3) equals 3985/7560.

16. The method of claim 12 wherein N equals 5, X(1) equals 193356/60480, X(2) equals 66994/60480, X(3) equals 65404/60480, and X(4) equals 29761/60480.

17. An apparatus for practicing the method of claim 1.

18. An apparatus for updating the attitude of a body by converting gyro measurements of the angular rate vector or the integrated angular rate vector of a body during an update interval into a change of attitude of the body during the update interval, the apparatus comprising:

an interface processor for obtaining measured values of the angular rate vector at a plurality of readout intervals;

a smoothing processor for obtaining a smoothed value of each of one or more smoothed representations of the angular rate vector at the end of each of a plurality of smoothing intervals, a smoothed representation being a weighted sum of the measured values obtained during a smoothing interval, at least one of the weights for at least one of the smoothed representations being different from the other weights for the same smoothed representation, the ratio of the smoothing interval to the readout interval being an integer N;

an updating processor for obtaining the updated attitude of the body at the end of an update interval by utilizing the attitude at the beginning of the update interval and the smoothed values of the smoothed representations of the angular rate vector obtained during the update interval, the ratio of the update interval to the smoothing interval being an integer.

19. The apparatus of claim 18 wherein the angular rate vector is represented within an update interval by a power series in time measured from the beginning of the update interval, the q'th vector coefficient being the vector coefficient of the q'th power of time, the q'th vector coefficient being proportional to the q'th derivative of the angular rate vector evaluated at the beginning of the update interval, q taking on integer values beginning with zero, the estimated q'th vector coefficient being a weighted sum of the smoothed values obtained during the update interval.

20. The apparatus of claim 18 wherein the updating processor updates the attitude at the end of an update interval by applying a rotation vector to the attitude at the end of the prior update interval, the rotation vector being a weighted sum of (1) a plurality of the smoothed values and (2) the values of a plurality of cross-products of the smoothed values, the smoothed values having been obtained during the update interval.

21. The apparatus of claim 18 wherein the smoothing processor obtains smoothed values of a plurality of smoothed representations of the angular rate vector for each smoothing interval, the smoothing interval being equal to the update interval.

22. The apparatus of claim 21 wherein the smoothing processor performs the operations:

summing the first n measured values of the angular rate vector in a smoothing interval to obtain the n'th value of a first smoothed representation of the angular rate vector, n taking on integer values from 1 to N, the N'th value of the first smoothed representation being the smoothed value of the first smoothed representation;

summing the first n values of the (k−1)'th smoothed representation of the angular rate vector to obtain the n'th value of a k'th smoothed representation of the angular rate vector, k being an integer greater than 1, the N'th value of the k'th smoothed representation being the smoothed value of the k'th smoothed representation.

23. The apparatus of claim 21 wherein the angular rate vector is represented within an update interval by a power series in time measured from the beginning of the update interval, the q'th vector coefficient being the vector coefficient of the q'th power of time, the q'th vector coefficient being proportional to the q'th derivative of the angular rate vector evaluated at the beginning of the update interval, q taking on integer values beginning with zero, the estimated q'th vector coefficient being a weighted sum of the smoothed values of a plurality of smoothed representations of the angular rate vector obtained during the smoothing interval.

24. The apparatus of claim 21 wherein the updating processor updates the attitude at the end of an update interval by applying a rotation vector to the attitude at the end of the prior update interval, the rotation vector being a weighted sum of (1) a plurality of the smoothed values and (2) the values of a plurality of cross-products of the smoothed values, the smoothed values having been obtained during the update interval.

25. The apparatus of claim 18 wherein the smoothing processor obtains a single smoothed value from a single smoothed representation of the angular rate vector during each smoothing interval.

26. The apparatus of claim 25 wherein the angular rate vector is represented within an update interval by a power series in time measured from the beginning of the update interval, the q'th vector coefficient being the vector coefficient of the q'th power of time, the q'th vector coefficient being proportional to the q'th derivative of the angular rate vector evaluated at the beginning of the update interval, q taking on integer values beginning with zero, the estimated q'th vector coefficient being a weighted sum of the smoothed values obtained during the update interval.

27. The apparatus of claim 25 wherein the updating processor updates the attitude at the end of an update interval by applying a rotation vector to the attitude at the end of the prior update interval, the rotation vector being a weighted sum of (1) a plurality of the smoothed values and (2) the values of a plurality of cross-products of the smoothed values, the smoothed values having been obtained during the update interval.

28. The apparatus of claim 27 wherein the number of smoothed representations is 1 and the attitude is updated at the end of an update interval by applying a rotation vector to the attitude at the end of the prior update interval, the rotation vector being a weighted sum of the smoothed values $S(m)$ and the cross-products of the smoothed values $S(m) \times S(m+p)$, the index m denoting the associated smoothing interval and taking on values from 1 to N−1, the index taking on values from 1 to N−m, the weights applied to each smoothed value and to each cross-product being proportional respectively to 1 and $X(p)$, the weight $X(p)$ being independent of m.

* * * * *